United States Patent [19]

Tödtemann et al.

[11] Patent Number: 5,234,979

[45] Date of Patent: * Aug. 10, 1993

[54] THERMOPLASTIC MOUNDING COMPOSITIONS WITH FLAME-REPELLANT PROPERTIES

[76] Inventors: Gert Tödtemann; Klaus Reinking, both of Bayer AG, D 5090 Leverkusen, Fed. Rep. of Germany

[*] Notice: The portion of the term of this patent subsequent to Sep. 8, 2004 has been disclaimed.

[21] Appl. No.: 147,788

[22] Filed: Jan. 25, 1988

Related U.S. Application Data

[63] Continuation of Ser. No. 875,609, Jun. 18, 1986, abandoned.

[30] Foreign Application Priority Data

Jun. 29, 1985 [DE] Fed. Rep. of Germany ....... 3523316

[51] Int. Cl.$^5$ ........................... C08K 5/53; C08K 5/52; C08K 5/51
[52] U.S. Cl. ..................... 524/130; 524/132; 524/135; 524/139; 524/140; 524/141; 524/142; 524/144; 524/514
[58] Field of Search ............. 524/130, 132, 135, 139, 524/140, 141, 142, 144, 504; 525/67, 132, 146, 147, 148

[56] References Cited

U.S. PATENT DOCUMENTS

| | | | |
|---|---|---|---|
| Re. 31,165 | 3/1983 | Serini et al. | 525/147 |
| 3,005,795 | 10/1961 | Busse et al. | 525/146 |
| 3,239,582 | 3/1966 | Keskkula | 525/148 |
| 3,294,871 | 12/1966 | Schmitt et al. | 525/146 |
| 3,404,122 | 10/1968 | Fritz et al. | 529/141 |
| 3,787,528 | 1/1974 | Benghiat | 524/130 |
| 3,809,676 | 5/1974 | Liberti | 524/135 |
| 4,463,130 | 7/1984 | Serini et al. | 525/147 |
| 4,560,725 | 12/1985 | Van Bokhoven et al. | 525/67 |
| 4,564,654 | 1/1986 | Serini et al. | 525/147 |
| 4,692,488 | 6/1988 | Kress et al. | 524/504 |
| 4,751,260 | 6/1987 | Kress et al. | 524/504 |

FOREIGN PATENT DOCUMENTS

| | | |
|---|---|---|
| 0103230 | 3/1984 | European Pat. Off. . |
| 0174493 | 3/1986 | European Pat. Off. . |
| 1109884 | 6/1961 | Fed. Rep. of Germany . |
| 2239512 | 2/1975 | France . |
| 1459648 | 4/1977 | United Kingdom . |

*Primary Examiner*—Kriellion S. Morgan

[57] ABSTRACT

The present invention relates to thermoplastic moulding compositions consisting of halogen-free polycarbonates, halogen-free polystyrene and/or halogen-free copolymers of styrene with acrylonitrile, halogen-free phosphorus compounds of the formula I $$R_1-(O)_n-\underset{\underset{R_2}{\overset{(O)_m}{|}}}{\overset{\overset{O}{\|}}{P}}-(O)_n-R_3 \quad \text{I}$$

and tetrafluoroethylene polymers, and, if appropriate, other known additives.

11 Claims, No Drawings

THERMOPLASTIC MOUNDING COMPOSITIONS WITH FLAME-REPELLANT PROPERTIES

This is a continuation of U.S. Ser. No. 875,609 filed Jun. 18, 1986, abandoned.

The present invention relates to thermoplastic moulding compositions consisting of
- A.) 40-95 parts by weight of a thermoplastic, halogen-free aromatic polycarbonate,
- B.) 60-5 parts by weight of a halogen-free copolymer of 50-100% by weight of styrene, α-methylstyrene, nuclear-alkylated styrenes or mixtures thereof, and 0-50% by weight of acrylonitrile,
- C.) 1-20 parts by weight, preferably 5-15 parts by weight, per 100 parts by weight of the total weight of A.)+B.), of a halogen-free phosphorus compound of the formula

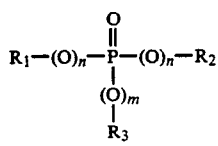

wherein
$R_1$, $R_2$ and $R_3$ independently of one another are $C_1$-$C_8$-alkyl or optionally alkyl-substituted $C_6$-$C_{20}$-aryl, and either
$n = m = $ zero, or
$n = 1$ and
$m$ is zero or 1, and
- D.) 0.05-5 parts by weight, preferably 0.1-1 part by weight, again per 100 parts by weight of the total weight of A.)+B.), of a tetrafluoroethylene polymer.

Thermoplastic, halogen-free aromatic polycarbonates of component A.) which are suitable according to the invention are those based on the diphenols of the formula II

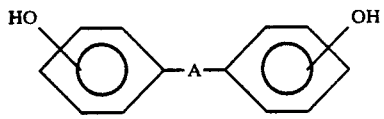

wherein
A is a single bond, $C_1$-$C^5$-alkylene, $C_2$-$C_5$-alkylidene, $C_5$-$C_6$-cycloalkylidene, —S— or —$SO_2$—.

Examples of suitable diphenols of the formula II are hydroquinone, resorcinol, 4,4'-dihydroxydiphenyl, 2,2-bis-(4-hydroxyphenyl)-propane, 2,4-bis-(4-hydroxyphenyl)-2-methylbutane or 1,1-bis-(4-hydroxyphenyl)-cyclohexane.

Preferred diphenols of the formula II are 2,2-bis-(4-hydroxyphenyl)-propane and 1,1-bis-(4-hydroxyphenyl)-cyclohexane.

The diphenols of the formula II either are known from the literature or can be prepared by processes which are known from the literature.

The preparation of the polycarbonates of component A.) which are suitable according to the invention is known from the literature and can be carried out, for example, with phosgene by the phase boundary process or with phosgene by the process in a homogeneous phase (the so-called pyridine process), the particular molecular weight to be established being achieved in a known manner by a corresponding amount of known chain stoppers.

The polycarbonates of component A.) which are suitable according to the invention have weight-average molecular weights ($\overline{M}w$, measured, for example, by ultracentrifugation or by scattered light measurement) of 10,000 to 100,000, preferably of 20,000 to 80,000.

The polycarbonates of component A.) which are suitable according to the invention are either homopolycarbonates or copolycarbonates.

The polycarbonates of component A.) which are suitable according to the invention can be branched in a known manner, and in particular preferably by incorporation of 0.05 to 2.0 mol %, based on the sum of the moles of diphenols employed, of compounds which are trifunctional or more than trifunctional, for example those with three or more than three or more phenolic OH groups.

Halogen-free polycarbonates in the context of the present invention means that the polycarbonates are built up from halogen-free diphenols, halogen-free chain stoppers and, if appropriate, from halogen-free branching agents, the content of minor ppm amounts of hydrolyzable chlorine resulting, for example, from the preparation of the polycarbonate with phosgene by the phase boundary process not being regarded as halogen-containing in the context of the invention. Such polycarbonates with ppm contents of hydrolyzable chlorine are halogen-free polycarbonates in the context of the present invention.

Halogen-free thermoplastic moulding compositions of component B.) which are suitable according to the invention are homopolymers of styrene and/or copolymers of styrene with acrylonitrile. The latter contain 50-95% by weight, preferably 70-90% by weight, of copolymerized styrene and/or alkyl-substituted styrenes with 1-4 C atoms in the alkyl radical, and 5-50% by weight, preferably 10-30% by weight, of copolymerized acrylonitriles. All or some of the styrene constituent can be replaced by p-methylstyrene or α-methylstyrene, in particular in order to improve the heat distortion point. Polystyrene and the styrene/acrylonitrile copolymers are commercially available or can be prepared by known processes (see, inter alia, H. Ohlinger, "Polystyrol" ("Polystyrene"), Springer Verlag 1953, DE-AS (German Published Specification) 1,001,001 and DE-AS (German Published Specification) 1,003,436). Their molecular weight Mw (weight-average from light scattering) is between $1.10^5$ and $3.10^5$.

The halogen-free phosphorus compounds of component C.) which are suitable according to the invention are generally known (see, for example, Ullmann, Enzyklopadie der technischen Chemie (Encyclopedia of Industrial Chemistry), Volume 18, page 301 et seq., 1979; Houben-Weyl, Meth. der organ. Chemie (Methods of Organic Chemistry), Volume 12/1, page 43, page 136; Beilstein, Volume 6, page 177).

Examples of phosphorus compounds of component C.), formula I, which are suitable according to the invention are triphenyl phosphate, tricresyl phosphate, diphenyl 2-ethylcresyl phosphate, tri-(isopropylphenyl) phosphate, diphenyl methanephosphonate, diethyl phenylphosphonate, triphenylphosphine oxide and tricresylphosphine oxide.

The tetrafluoroethylene polymers of component D.) which are suitable according to the invention are polymers with fluorine contents of 65-76% by weight, preferably 70-76% by weight. Examples are polytetrafluoroethylene, tetrafluoroethylene/hexafluoropropylene copolymers and tetrafluoroethylene copolymers with small amounts of chlorine-free copolymerizable ethylenically unsaturated monomers.

These polymers are known. They can be prepared by known processes, thus, for example, by polymerization of tetrafluoroethylene in an aqueous medium with a catalyst which forms free radicals, for example sodium peroxydisulphate, potassium peroxydisulphate or ammonium peroxydisulphate, under pressures from 7 to 70 kg/cm$^2$ and at temperatures from 0° to 200° C., preferably at temperatures from 20° to 100° C. (with respect to the polymerization of tetrafluoroethylene see also U.S. Pat. No. 2,393,697 and U.S. Pat. No. 2,534,058). The polytetrafluoroethylene powders obtained by coagulation or by precipitation and, if appropriate, by subsequent grinding from suspensions, dispersions or emulsions thus prepared have average particle size of between 2 and 800 μm. A suitable polytetrafluoroethylene is Hostaflon TF 2026 from Hoechst.

Teflon-containing thermoplastics, such as polycarbonates or polystyrenes or polymers of acrylonitrile, are known (see, for example, U.S. Pat. Nos. 3,005,795 and 3,294,871). British Patent Specification 1,459,648 describes flame-repellant, non-dripping polymers, for example of polystyrene or of polycarbonates, to which a flame-proofing additive, such as, for example, triphenyl phosphate, a non-combustible fibre material and polytetrafluoroethylene resin, have been added. Example 2 of British Patent Specification 1,459,648 shows that polytetrafluoroethylene resin without addition of fibre does not prevent dripping.

Foamable thermoplastics are known from DE-OS (German Published Specification) 2,434,085, thermoplastics mentioned being, inter alia, polycarbonates, polymers or mixtures thereof. Polystyrenes and styrene/acrylonitrile copolymers are mentioned as polymers. The foamable plastics can contain phosphate esters, if appropriate in combination with halogen compounds, as flame-proofing agents. No polytetrafluoroethylene polymers are recommended as halogen compounds.

The addition of pentaerythritol diphosphates and diphosphonates as flame-proofing agents for polycarbonates is described in DE-OS (German Published Specification) 2,921,325, it also being possible for halogen compounds additionally to be used, and these, according to U.S. Pat. No. 3,392,136 cited on page 9 of DE-OS (German Published Specification) 2,921,325, can also be polyvinylidene fluoride. ABS copolymers can be admixed to the polycarbonates.

Flame-repellant ABS polymers and flame-repellant mixtures of polyphenylene ether resins with polymeric vinyl-aromatics containing polytetrafluoroethylenes are known from U.S. Pat. Nos. 4,355,126 and 4,107,232. Triphenylphosphate is the particularly preferred flame-proofing agent.

Flame-repellant mixtures of polycarbonates and ABS polymers which can contain particular organic sulphonates and fluorinated polyolefins are known from DE-OS (German Published Specification) 2,903,100.

Flame-repellant polymer mixtures of particular polycarbonates, styrene polymers and polyphosphates with molecular weights Mw of 1,600 to 150,000 which can contain polytetrafluoroethylene are known from EP-OS (European Published Specification) 0,103,230.

However, the polycarbonates of these moulding compositions are built up predominantly from tetramethylated diphenols.

Flame-repellant thermoplastic moulding compositions which contain
(a) aromatic polycarbonates,
(b) SAN graft polymers,
(c) thermoplastic polymers,
(d) if appropriate, halogen compounds,
(e) antimony trioxide, antimony carbonate, bismuth trioxide or bismuth carbonate and
(f) a fine-particled tetrafluoroethylene polymer,
this being introduced into the moulding composition by an aqueous emulsion of the SAN graft polymer (b) and, if appropriate, an aqueous emulsion of the thermoplastic polymer (c), whereupon good surfaces of the moulding compositions are achieved, are known from DE-SO (German Published Specification) 3,322,260.

The thermoplastic moulding compositions according to the invention can contain other additives known for polycarbonates or for homo- and/or copolycarbonates of styrene, such as stabilizers, pigments, flow control agents, mould release agents and/or antistatics.

The thermoplastic moulding compositions according to the invention, consisting of components A.), B.), C.) and D.) and, if appropriate, other known additives, such as stabilizers, pigments, flow control agents, mould release agents and/or antistatics, are prepared by a process in which the particular constituents are mixed in a known manner and then subjected to melt compounding or melt extrusion at temperatures of 220° to 330° C. in customary units, such as internal kneaders or one- or two-screw extruders, or in which the solutions or suspensions of the particular components in suitable organic solvents, for example chlorobenzene, are mixed and these mixtures are evaporated in customary evaporation units, for example in evaporation extruders.

The present invention thus also relates to a process for the preparation of thermoplastic moulding compositions consisting of components A.), B.), C.) and D.) and, if appropriate, stabilizers, pigments, flow control agents, mould release agents and/or antistatics, which is characterized in that components A.), B.), C.) and D.) and, if appropriate, stabilizers, pigments, flow control agents, mould release agents and/or antistatics are mixed in a known manner and then subjected to melt compounding or melt extrusion at temperatures of 220° to 330° C. in customary units, or in that the solutions or suspensions of these components in suitable organic solvents are mixed and these mixtures are evaporated in customary evaporation units.

The moulding compositions of the present invention can be used for the production of all types of shaped articles. In particular, shaped articles can be produced by injection moulding. Examples of shaped articles which can be produced are: housing components of all types (for example for domestic appliances, such as coffee machines or mixers) or covering sheets for the construction sector and components for the motor vehicle sector. They are also employed in the field of electrical engineering because they have very good electrical properties.

Another form of processing is the production of shaped articles by deep-drawing or thermoforming of sheets or films produced beforehand by extrusion.

EXAMPLES

Blend components employed: A.) Polycarbonate of 2,2-bis-(4-hydroxyphenyl)-propane (bisphenol A) with a relative solution viscosity of 1.320, measured in methylene chloride at 23° C. and a concentration of 0.5% by weight.

B.1.) Polystyrene. Average molecular weight $\overline{M}w = 250,000$.

B.2.) Styrene/acrylonitrile copolymer. Acrylonitrile content = 10% by weight. Average molecular weight $\overline{M}w = 200,000$.

B.3.) Styrene/acrylonitrile copolymer. Acrylonitrile content = 28% by weight. Average molecular weight $\overline{M}w = 180,000$.

C.1.) Diphenyl cresyl phosphate
C.2.) Triphenyl phosphate
C.3.) Triphenylphosphine oxide
C.4.) Diphenyl methyl phosphonate D.) Tetrafluoroethylene polymer in powder form with a particle size of 500 to 650 μm and a density of 2.18 to 2.20 g/cm² from Hoechst (Hostaflon TF 2026).

Components A.), B 1–3), C 1–4) and D.) were compounded on a twin-screw extruder (ZSK 32 from Werner & Pfleiderer) at temperatures between 220° and 250° C.

The shaped articles were produced on an injection-moulding machine at 250° C.

The burning properties of the samples was measured in accordance with UL-Subj. 94 V in test piece thicknesses of 1.6 and 3.2 mm. The UL 94 V test is carried out as follows:

Samples of the substance are shaped to bars with dimensions of 127×12.7×1.6 mm or 127×12.7×3.2 mm. The bars are mounted vertically so that the underside of the test piece is 305 mm above a strip of bandaging material. Each test bar is ignited individually by means of two successive ignition operations lasting 10 seconds. The burning characteristics are observed after each ignition operation and the sample is then evaluated. A Bunsen burner with a 10 mm (⅜ inch) high blue flame of natural gas with a heat content of $3.73 \times 10^4$ kj/m³ (1.000 BTU per cubic foot) is used for igniting the sample.

The UL 94 V-O classification comprises the characteristics described below for materials which are tested in accordance with the UL 94 specification. The materials in this class contain no samples which burn for longer than 10 seconds after each action of the test flame; they show no total flaming time of longer than 50 seconds when the flame acts twice on each sample batch; they contain no samples which burn completely up to the holding clamp attached to the upper end of the sample; they contain no samples which ignite the cotton-wool underneath the sample by burning drips or particles; they also contain no samples which glow for longer than 30 seconds after the removal of the test flame.

Other UL classifications describe samples which have a longer after-burn time (classification V-1) or which also release burning drips or particles which ignite cotton wool underneath the sample (classification V-2). The classification n.p. means "not passed" and denotes that the samples have an after-burn time of ≧30 seconds.

The exact compositions of the moulding materials tested and the UL 94 classifications obtained can be seen from the following table.

| | A parts by weight | B 1 parts by weight | B 2 parts by weight | B 3 parts by weight | C 1 parts by weight | C 2 parts by weight | C 3 parts by weight | C 4 parts by weight | D parts by weight | UL 94 (1.6 mm) | UL 94 (3.2 mm) |
|---|---|---|---|---|---|---|---|---|---|---|---|
| | | | | | Comparison experiments | | | | | | |
| V 1 | 75 | 25 | | | | | | | | n.p. | n.p. |
| V 2 | 80 | 20 | | | | | | | | n.p. | n.p. |
| V 3 | 75 | | 25 | | | | | | | n.p. | n.p. |
| V 4 | 80 | | 20 | | | | | | | n.p. | n.p. |
| V 5 | 75 | | | 25 | | | | | | n.p. | n.p. |
| V 6 | 80 | | | 20 | | | | | | n.p. | |
| | | | | | Experiments according to the present invention | | | | | | |
| E 1 | 75 | 25 | | | 10 | | | | 0.25 | V-1 | V-0 |
| E 2 | 80 | 20 | | | 10 | | | | 0.25 | V-0 | V-0 |
| E 3 | 75 | | 25 | | 10 | | | | 0.2 | V-2 | V-0 |
| E 4 | 75 | | | 25 | 10 | | | | 0.2 | V-1 | V-0 |
| E 5 | 80 | | 20 | | 10 | | | | 0.25 | V-0 | V-0 |
| E 6 | 80 | | | 20 | 10 | | | | 0.2 | V-0 | V-0 |
| E 7 | 75 | | 25 | | | 10 | | | 0.3 | V-1 | V-0 |
| E 8 | 75 | | | 25 | | 10 | | | 0.25 | V-1 | V-0 |
| E 9 | 80 | | 20 | | | 10 | | | 0.25 | V-0 | V-0 |
| E 10 | 80 | | 20 | | | | 10 | | 0.3 | V-0 | V-0 |
| E 11 | 80 | | | 20 | | | 7.5 | | 0.25 | V-2 | V-0 |
| E 12 | 80 | | 20 | | | | | 10 | 0.25 | V-0 | V-0 |

We claim:
1. A thermoplastic moulding composition consisting essentially of A) 40 to 95 parts by weight of a thermoplastic, halogen-free branched or unbranched aromatic homopolycarbonates or copolycarbonates of the diphenols of the formula (II)

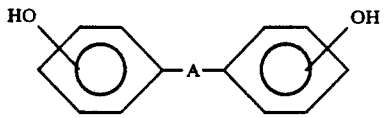

wherein

A is a single bond, $C_1$-$C_5$-alkylene, $C_2$-$C_5$-alkylidene, $C_5$-$C_6$-cycloalkylidene, —S— or —$SO_2$—;

B) 60 to 5 parts by weight of a halogen-free copolymer of 50 to 100% by weight of styrene, a-methylstyrene, nuclear-alkylated styrenes or mixtures thereof, and 0 to 50% by weight of acrylonitrile, C) 5 to 15 parts by weight, per 100 parts by weight of the total weight of A)+B), of a halogen-free phosphorus compound of the general formula

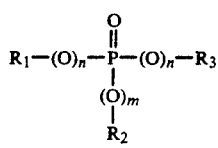

wherein $R_1$, $R_2$ and $R_3$ independently of one another denote an optionally alkyl-substituted $C_6$ to $C_{20}$-aryl radical, and either n and m are zero, or n is 1 and m is zero or 1, and D) 0.1 to 1 part by weight, again per 100 parts by weight of the total weight of A)+B), of a tetrafluoroethylene polymer.

2. A moulding composition according to claim 1, in which the phosphorus compound of formula (I) is selected from triphenyl phosphate, tricresyl phosphate, diphenyl 2-ethylcresyl phosphate, tri-(isopropylphenyl) phosphate, diphenyl methanephosphonate, diethyl phenylphosphonate, triphenylphosphine oxide and tricresylphosphine oxide.

3. A moulding composition according to claim 1, in which the tetrafluoroethylene polymer is selected from polytetrafluoroethylene, tetrafluoroethylene/hexfluoropropylene copolymers and tetrafluoroethylene copolymers with minor amounts of chlorine-free copolymerizable ethylenically unsaturated monomers.

4. A moulding composition according to claim 1, additionally containing at least one additive selected from stabilizers, pigments, flow control agents, mould release agents and antistatics.

5. A process for the production of a moulding composition according to claim 1, in which components A.), B.), C.) and D.) are mixed and then subjected to melt compounding or melt extrusion at temperatures of 220° C. to 330° C. in melt compounding or melt extrusion units.

6. A process for the production of a moulding composition according to claim 1, in which a solution of components A.), B.) and C.) and a dispersion of component D.) are mixed in an organic solvent and the mixture is then evaporated in an evaporation unit.

7. A process according to claim 5, in which at least one additive selected from stabilizers, pigments, flow control agents, mould release agents and antistatics is included in the mixture or solution/dispersion.

8. A moulding composition, whenever produced by the process of claim 5.

9. A moulded article whenever formed of a moulding composition according to claim 8.

10. A moulding composition according to claim 1 wherein the branched or unbranched polycarbonate of component (A) is obtained from bis-hydroxy-phenyl propane or bis-hydroxyphenyl cyclohexane.

11. A moulding composition according to claim 1 wherein the branched or unbranched polycarbonate of component (A) is a homopolycarbonate obtained from bis-phenol-A.

* * * * *